Sept. 2, 1930.  W. H. HARDMAN ET AL  1,775,078
ELECTRODE FOR ARC LAMPS
Filed July 6, 1925
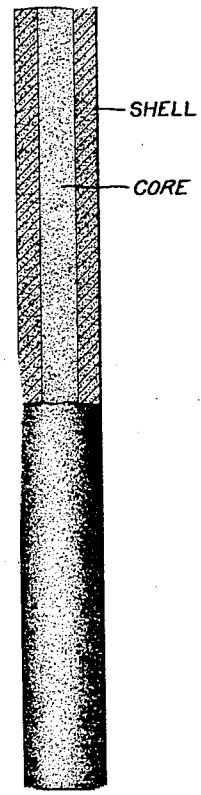
Inventors
William H. Hardma,
Fred Girvin,
by Charles E. Tullar
Their Attorney.

Patented Sept. 2, 1930

1,775,078

UNITED STATES PATENT OFFICE

WILLIAM H. HARDMAN AND FRED GIRVIN, OF SCHENECTADY, NEW YORK, ASSIGNORS TO GENERAL ELECTRIC COMPANY, A CORPORATION OF NEW YORK

ELECTRODE FOR ARC LAMPS

Application filed July 6, 1925. Serial No. 41,888.

Reference is had to the accompanying drawing in which we have shown, in elevation and partly in section, an electrode such as may be made according to our invention.

Our invention relates to electrodes for the electric arc, and more in particular to electrodes for the so-called high intensity type of arc. Heretofore, cored, high intensity electrodes have been made adapted to carry a load of 150 amperes at a voltage as high as 78 volts. Electrodes of this type consist of a shell about 16 mm. in diameter and 8 mm. core. This shell is composed of calcined coke and lamp black and a necessary binder, such as coal tar. This electrode is provided with a core which is composed of a mixture of lamp black and a mineral salt.

It is the object of our invention to provide an electrode which will permit the use of a current as high as 250 amperes or over and which will give a steady intense light, (as high as 50% or over) stronger than when ordinary electrodes are used.

In order to accomplish the foregoing we use electrodes of the cored type, the details and ingredients of which are as follows:

In place of the usual core the electrodes of our invention are provided with a core which contains a mixture of cerium oxide, tungsten carbide, boron oxide, lamp black and tar.

We find that excellent results are obtained by using the following proportions of the ingredients: cerium oxide 56%, tungsten carbide 6%, $B_2O_3$ (boric oxide) 1%, carbon 37%, which may be in the form of fired lamp black. In addition, we use as a binder coal tar, the amount of which may be from 25 to 30% of all of the other ingredients of the core above listed.

It will be seen, therefore, that we use for the core about 63% of salts and 37% of lamp black and, in addition, the binder.

With reference to the cerium and tungsten compounds, these may be varied somewhat, for example, the proportions may be varied by raising the cerium oxide to as high as 59% and lowering the tungsten carbide as low as 3% or over. It will be seen, therefore, that the proportions of cerium and carbon ingredients are large as compared with the boron or tungsten ingredients. For example, the carbon is substantially six times the tungsten carbide ingredient and the cerium oxide is substantially nine times the tungsten carbide ingredient.

With electrodes of this sort having a diameter of 16 mm. and a core of 8 mm. in thickness the current flow may be increased above 150 amperes and carried as high even as 250 amp. with a very material increase in the amount of light, which increase may be as high as 50% over that produced with any of the electrodes of the prior art.

What we claim as new and desire to secure by Letters Patent of the United States, is:

1. An electrode for an arc having a conducting shell and a core, the latter comprising cerium and boron compounds, carbon, a carbide of tungsten and a carbonaceous binder.

2. An electrode for an arc having a shell consisting mainly of carbon, said shell having a core consisting of a mixture of boric oxide 1%, cerium oxide 56%, carbon 37%, and tungsten carbide 6%.

3. An electrode for an arc having a shell, a core within said shell, said core consisting of comparatively large proportions of both cerium compound and carbon, and small proportions of both a boron compound and of tungsten carbide and a binder.

4. An electrode for an arc having a shell, a core within said shell, said core consisting of comparatively large proportions of both cerium compound and carbon, and small proportions of both a boron compound and of tungsten carbide, and a binder for the ingredients of the core, said binder consisting of a carbonaceous material, the proportion of which with reference to all of the other ingredients is comparatively large.

5. An electrode for an arc having a conducting shell and a core, the latter comprising cerium and boron compound, carbon, and a carbide of tungsten, and a binder for the ingredients of the core, said binder consisting of a carbonaceous material, the proportion of which with reference to all of the other ingredients is comparatively large.

6. An electrode for an arc having a shell consisting mainly of carbon, said shell having a core consisting substantially of a mixture of boric oxide 1%, cerium oxide 56%, carbon 37%, tungsten carbide 6%, and a binder.

In witness whereof, we have hereunto set our hands this 3rd day of July, 1925.

WILLIAM H. HARDMAN.
FRED GIRVIN.